United States Patent
Hua et al.

(10) Patent No.: US 8,837,560 B2
(45) Date of Patent: Sep. 16, 2014

(54) METHOD AND DEVICE FOR THE CONTACTLESS TRANSMISSION OF ELECTRICAL POWER AND INFORMATION

(75) Inventors: Zhidong Hua, Karlsruhe (DE); Olaf Simon, Bruchsal (DE); Thomas Schäfer, Neuthard (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 169 days.

(21) Appl. No.: 13/264,961

(22) PCT Filed: Apr. 9, 2010

(86) PCT No.: PCT/EP2010/002212
§ 371 (c)(1),
(2), (4) Date: Oct. 17, 2011

(87) PCT Pub. No.: WO2010/118838
PCT Pub. Date: Oct. 21, 2010

(65) Prior Publication Data
US 2012/0039371 A1  Feb. 16, 2012

(30) Foreign Application Priority Data
Apr. 17, 2009  (DE) .......... 10 2009 017 552

(51) Int. Cl.
*H04B 1/38* (2006.01)
*H04L 5/16* (2006.01)
*H04L 1/08* (2006.01)

(52) U.S. Cl.
CPC ..................................... *H04L 1/08* (2013.01)
USPC ........... 375/219; 375/296; 375/340; 375/350; 455/296

(58) Field of Classification Search
USPC .......... 370/329, 328; 375/346, 340, 350, 219, 375/296; 455/307, 296
See application file for complete search history.

(56) References Cited

U.S. PATENT DOCUMENTS

| 4,128,809 | A | 12/1978 | Kage |
| 4,264,955 | A | 4/1981 | Goodwin |
| 4,577,332 | A | 3/1986 | Brenig |
| 5,345,231 | A * | 9/1994 | Koo et al. ................ 340/870.31 |
| 6,091,782 | A | 7/2000 | Harano |
| 6,185,258 | B1 * | 2/2001 | Alamouti et al. ............ 375/260 |
| 6,243,412 | B1 * | 6/2001 | Fukawa ........................ 375/219 |
| 6,412,094 | B1 | 6/2002 | Van Holten et al. |

(Continued)

FOREIGN PATENT DOCUMENTS

| DE | 103 49 242 | | 4/2005 | |
| DE | 10349242 B3 | * | 4/2005 | ............. G08C 17/04 |

OTHER PUBLICATIONS

International Preliminary Report on Patentability, issued in corresponding International Application No. PCT/EP2010/002212.

(Continued)

*Primary Examiner* — Daniel Washburn
*Assistant Examiner* — Amneet Singh
(74) *Attorney, Agent, or Firm* — Kenyon & Kenyon LLP

(57) ABSTRACT

In a method for interference suppression of a signal composed of symbols, each symbol is transmitted twice in temporal succession as first symbol and second symbol, so that a segment of a symbol corresponds to a segment of the first symbol and a segment of the second symbol. An interference-suppressed signal is composed from the first and second symbols.

15 Claims, 5 Drawing Sheets

(56) References Cited

U.S. PATENT DOCUMENTS

| | | | |
|---|---|---|---|
| 6,462,432 B1* | 10/2002 | Seelig et al. | 307/33 |
| 6,515,878 B1* | 2/2003 | Meins et al. | 363/37 |
| 6,690,665 B1* | 2/2004 | Choi et al. | 370/376 |
| 6,720,824 B2* | 4/2004 | Hyakudai et al. | 329/304 |
| 7,272,108 B2* | 9/2007 | Li et al. | 370/203 |
| 7,340,009 B2* | 3/2008 | Giannakis et al. | 375/299 |
| 7,411,894 B2* | 8/2008 | Ro et al. | 370/203 |
| 7,526,042 B2* | 4/2009 | Yoshida | 375/285 |
| 7,609,782 B2* | 10/2009 | Giannakis et al. | 375/299 |
| 7,627,463 B2* | 12/2009 | Chidhambarakrishnan | 703/14 |
| 7,701,916 B2* | 4/2010 | Dabak et al. | 370/342 |
| 8,116,353 B2* | 2/2012 | El Nahas El Homsi et al. | 375/148 |
| 8,300,745 B2* | 10/2012 | Guess et al. | 375/346 |
| 8,339,930 B2* | 12/2012 | Gore et al. | 370/203 |
| 8,406,114 B2* | 3/2013 | Sandhu | 370/204 |
| 2002/0122383 A1* | 9/2002 | Wu et al. | 370/210 |
| 2003/0142764 A1* | 7/2003 | Keevill et al. | 375/341 |
| 2004/0017843 A1* | 1/2004 | Fitton et al. | 375/148 |
| 2004/0022174 A1* | 2/2004 | Li et al. | 370/203 |
| 2004/0028121 A1* | 2/2004 | Fitton | 375/144 |
| 2004/0184550 A1* | 9/2004 | Yoshida et al. | 375/260 |
| 2004/0223449 A1* | 11/2004 | Tsuie et al. | 370/204 |
| 2004/0227036 A1* | 11/2004 | Arita et al. | 246/209 |
| 2005/0058230 A1* | 3/2005 | Thomas et al. | 375/347 |
| 2005/0059431 A1* | 3/2005 | Matsui et al. | 455/562.1 |
| 2007/0025460 A1* | 2/2007 | Budianu et al. | 375/260 |
| 2007/0057718 A1* | 3/2007 | Coulson | 327/551 |
| 2007/0070951 A1* | 3/2007 | Ocket et al. | 370/334 |
| 2007/0145936 A1* | 6/2007 | Simon et al. | 318/693 |
| 2007/0242798 A1* | 10/2007 | Popescu | 378/21 |
| 2007/0268973 A1* | 11/2007 | Fanson | 375/257 |
| 2007/0280098 A1* | 12/2007 | Bhatt et al. | 370/208 |
| 2008/0123547 A1* | 5/2008 | Palanki | 370/252 |
| 2008/0218395 A1* | 9/2008 | Tomioka et al. | 341/155 |
| 2008/0298437 A1* | 12/2008 | Currivan et al. | 375/144 |
| 2008/0304583 A1* | 12/2008 | Miyoshi et al. | 375/260 |
| 2009/0103648 A1* | 4/2009 | Fukuoka et al. | 375/267 |
| 2009/0233598 A1* | 9/2009 | Fukuoka et al. | 455/434 |
| 2009/0245091 A1* | 10/2009 | Lin et al. | 370/210 |
| 2009/0303869 A1* | 12/2009 | Umari et al. | 370/210 |
| 2010/0067366 A1* | 3/2010 | Nicoli | 370/210 |
| 2010/0148505 A1* | 6/2010 | Dunlap et al. | 290/44 |
| 2010/0208847 A1* | 8/2010 | Reial et al. | 375/340 |
| 2011/0069742 A1* | 3/2011 | Narayan et al. | 375/148 |
| 2012/0076228 A1* | 3/2012 | Wu et al. | 375/267 |
| 2012/0188881 A1* | 7/2012 | Ma et al. | 370/252 |

OTHER PUBLICATIONS

European Office Action, dated Aug. 31, 2012, issued in corresponding European Patent Application No. 10718866.6.
International Search Report, issued in corresponding International Application No. PCT/EP2010/002212.

* cited by examiner

METHOD AND DEVICE FOR THE CONTACTLESS TRANSMISSION OF ELECTRICAL POWER AND INFORMATION

FIELD OF THE INVENTION

The present invention relates to a device and a method for the contactless transmission of electrical power and information.

BACKGROUND INFORMATION

A method and a device for the contactless transmission of electrical power and information is described in German Patent No. 103 49 242.

U.S. Pat. No. 6,091,782 describes a method in which the digital amplitude values of a multi-stage signal transmitted multiple times is stored in locations of a memory that correspond to a transmission. At the same time, a set of amplitude values is read out of the locations of the memory and compared to decision limit value bands, which represent corresponding data symbols. A decision in favor of the data symbol of a corresponding decision limit value band is made if the plurality of the set of amplitude values lies within the decision limit value band, or is made in favor of the data symbol of the particular decision limit value band in which an amplitude value lies, or to which an amplitude value comes closest, when no other amplitude value lies closer to another decision limit value band.

U.S. Pat. No. 4,577,332 describes a method in which digital signals are transmitted twice. A receiver decodes the two signals and determines a value and a deviation of each signal from a predefined level. Weighting, which is conversely proportional to the deviation, is assigned to each signal. The value of the particular signal having the greater weighting is assumed to be correct.

A method for performing ⅗ majority voting for TACS/AMPS mobile phone systems is described in U.S. Pat. No. 6,412,094. Each word of a data frame is repeated five times, and each bit of a word is given a value, by majority voting across the five repeats.

U.S. Pat. No. 4,128,809 describes a diversity receiver for processing signal bits received repeatedly, taking a maximum level and/or a preferably received signal bit into account.

U.S. Pat. No. 4,264,955 describes a decision circuit, which provides a correct output signal which is derived from the two closest-lying signal levels of three input signals, the three input signals all relating to measurements of the same phenomenon.

SUMMARY

Example embodiments of the present invention provide a device and a method for the contactless transmission of electrical power and information.

Among features of example embodiments of the present invention in the method for interference suppression of a signal composed of symbols are that each symbol is transmitted twice in temporal succession, as first symbol and second symbol, so that a segment of a symbol corresponds to a segment of the first symbol and a segment of the second symbol; a detector recognizes the interference in the first and/or second symbol and transmits a value to a decision element, the decision element generating an interference-suppressed symbol from the first and second symbol on the basis of the value, according to the following decision pattern.

in a segment of the first type, the detector detects interference in the first symbol and an absence of interference in the second symbol, whereupon the decision element sets the interference-suppressed symbol for this segment of the first type to be equal to the second symbol, in a segment of the second type, the detector detects interference in the second symbol and an absence of interference in the first symbol, whereupon the decision element sets the interference-suppressed symbol for the segment of the second type to be equal to the first symbol, in a segment of the third type, the detector detects interference in the first symbol and in the second symbol, whereupon the decision element sets the interference-suppressed symbol for the segment of the third type to be equal to an average value from the first and second symbol, in a segment of the fourth type, the detector detects an absence of interference in the first symbol and in the second symbol, whereupon the decision element sets the interference-suppressed symbol for the segment of the third type to be equal to an average value from the first and second symbol.

This has the advantage that temporally restricted interference is able to be reliably eliminated at good utilization of the bandwidth.

In example embodiments, the detector detects the interference when the signal exceeds a threshold value. This is advantageous insofar as interference is detected in reliable manner.

In example embodiments, the detector detects the interference by pattern recognition, especially correlation or autocorrelation. This is advantageous insofar as even complicated interference is able to be detected.

In example embodiments, the signal forwarded to the detector is high-pass-filtered. This is advantageous insofar as the signal is kept away from the detector.

In example embodiments, the first symbol and the second symbol are temporally superposed by a memory element, in particular a FIFO element. This is advantageous insofar as the symbols are processed at the same time.

In example embodiments, an interference value of the detector that corresponds to the first symbol is temporally superposed by an interference value of the second symbol by an additional memory element, and the two n-bit interference values are therefore used to form the value as two times n-bit, n being equal to one, in particular. This is advantageous insofar as the information about the interference in the first and second symbol is available and may be processed at the same time.

In example embodiments, the value of a weighting corresponds to the intensity of the interference, which the detector determines, and in the third segment, when interference occurs in the first and second symbol simultaneously, the decision element calculates the interference-suppressed symbol according to the weighting of the interference, from the first and second symbol. This is advantageous insofar as effective interference suppression of the signal is possible even when interference is present for the same information segment in the first and second symbol.

In example embodiments, the interference at least partially occurs periodically, and the first symbol and the second symbol are situated in one period. This is advantageous insofar as the interference is unable to ever occur in the first and the second symbol.

In example embodiments, an OFDM method is used for the signal transmission. This has the advantage that an OFDM method is able to avoid interference in the frequency range quite well, so that optimal interference suppression is provided in the frequency range and in the time range.

Among features in the electronic system for implementing the method are that the method is implementable. This has the advantage of allowing an electronic system to be produced in flexible and cost-effective manner.

Among features of the receiver for a signal composed of OFDM symbols are that the receiver includes an analog-digital converter and a digital OFDM decoder connected thereto, an electronic system which executes an afore-described method being disposed between the analog-digital converter and the digital OFDM decoder. This is advantageous insofar as the method is easy to integrate into an OFDM method.

Among features of the device for the contactless transmission of electrical power and information from a first part to a second part that is movable with respect to the first part are that an alternating voltage source or an alternating current source impresses a voltage or a current having a first frequency into a primary conductor of the first part, the second part having a secondary winding which is electromagnetically coupled to the primary conductor; additional data signals having a carrier frequency that is higher than the first frequency are coupled or modulated onto the primary conductor, interference in the data signal being suppressed using an afore-described method. This has the advantage that data are transmittable in contactless and reliable manner at a high bandwidth yield.

In example embodiments, the second part includes the receiver. This is advantageous insofar as the data signal is transmittable in reliable manner and at a low error rate.

In example embodiments, the first part has an infeed controller, which uses a mains voltage for conversion into a three-stage square-wave voltage having the first frequency, and impresses it into the primary conductor, preferably via a voltage-controlled current source. This has the advantage of bringing about periodic interference, which is able to be filtered out by the afore-described method in a simple and reliable manner.

In example embodiments, the secondary winding is inductively coupled to the primary conductor, the secondary winding having a capacity switched in series or in parallel, the associated resonant frequency substantially corresponding to the first frequency. This has the advantage that energy and the data signal are able to be transmitted with high efficiency.

Further features, aspects, and advantages of example embodiments of the present invention are described in more detail below.

LIST OF REFERENCE NUMERALS 1 infeed device
2 movable part
3 inductive coupling
10 signal
11 a symbol
12 first symbol of the symbol
14 second symbol of the symbol
15 a further symbol
16 first symbol of the further symbol
18 second symbol of the further symbol
20 first interference
22 second interference
24 third interference
26 fourth interference
30 interference-suppressed symbol of the symbol
32 additional interference-suppressed symbol of the additional symbol
36 signal input
38 signal output
40 detector
42 decision element
44 memory element
46 additional memory element
48 first multiplier
50 adding element
52 second multiplier
54 analog-digital converter
60 infeed controller
62 rectifier
64 intermediate circuit capacitor
66 inverter Example embodiments of the present invention are explained in greater detail below with reference to the Figures.

DETAILED DESCRIPTION

Figure 1:
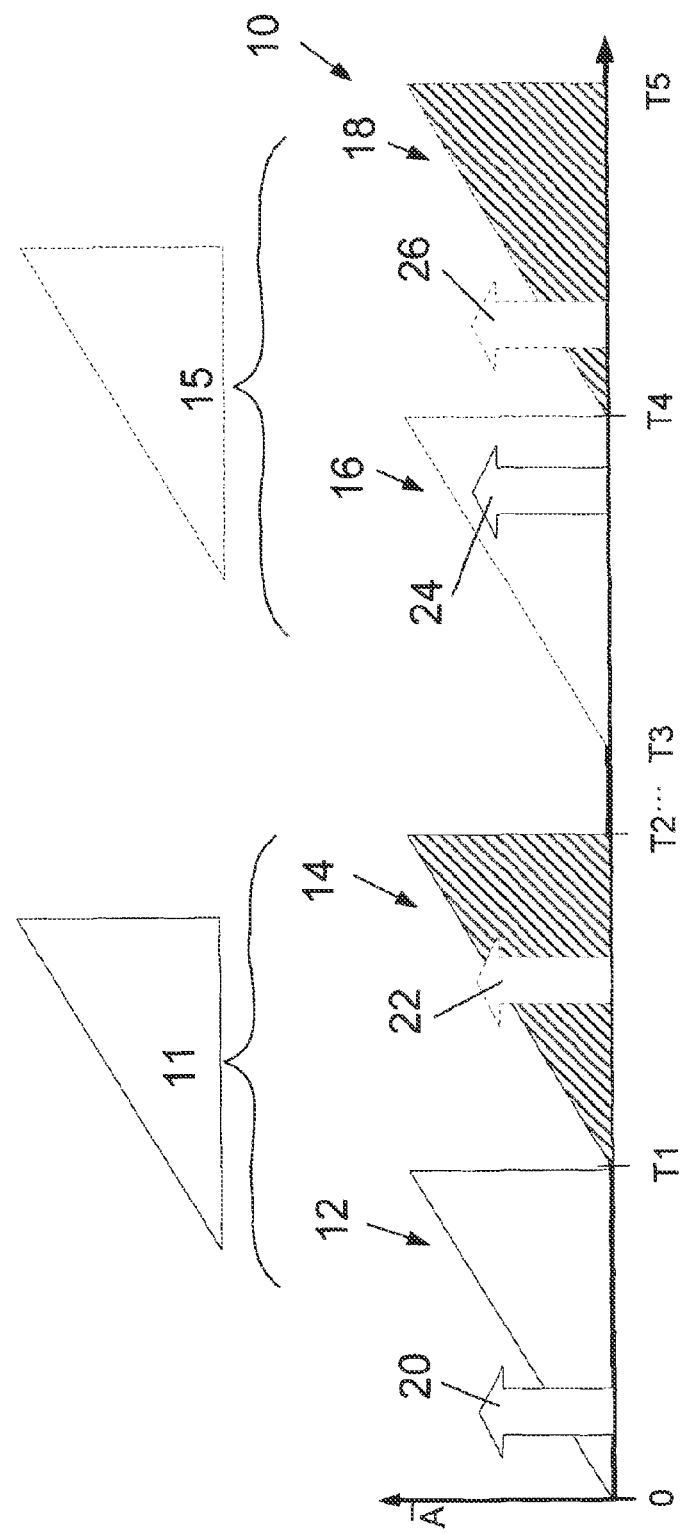
FIG. 1 schematically illustrates a signal composed of symbols having interference.

FIG. 1 schematically illustrates a signal 10 composed of symbols 11, 15. Each symbol 11, 15 is transmitted twice in temporal succession as first symbol 12, 16 and as second symbol 14, 18. The triangular representation of symbols 12, 14, 16, 18 shown in FIG. 1 is purely schematic. A segment of a symbol 11, 15 corresponds to a segment of first symbol 12, 16 and a segment of second symbol 14, 18.

Interferences 20, 22, 24, 26 arise in the course of signal 10. Interferences 20, 22, 24, 26 are restricted in time and occur periodically or aperiodically over time. In periodic interference, the period is greater than the time in which first symbol 12, 16 and second symbol 14, 18 are transmitted, so that only one of the two symbols of first and second symbol 12, 16, 14, 18 is subjected to interference by the periodic interference.

For example, first interference 20 lies in a starting range of first symbol 12 and thus interferes with a first segment of first symbol 12 of symbol 11, which corresponds to a first segment of symbol 11. The first segment of second symbol 14 of symbol 11 is free of interference, that is to say, no interference arises. As a result, the first segment of symbol 11 is transmitted without interference by second symbol 14 of symbol 11.

Second interference 22 occurs in second symbol 14 of symbol 11, third interference 24 occurs in first symbol 16 of additional symbol 15, and fourth interference 26 occurs in second symbol 18 of further symbol 15. In this example, each temporal segment of symbol 11 or further symbol 15 is . . . at least by one of first symbols 12, 16 or second symbols 14, 18, without interference.

It is also possible that, by chance, random interference in a transmitted symbol arises in the first symbol and in the second symbol of the transmitted signal such that a segment of the transmitted symbol has interference in the first and the second symbol. But even in such a case the method described herein improves the signal transmission.

Figure 2:
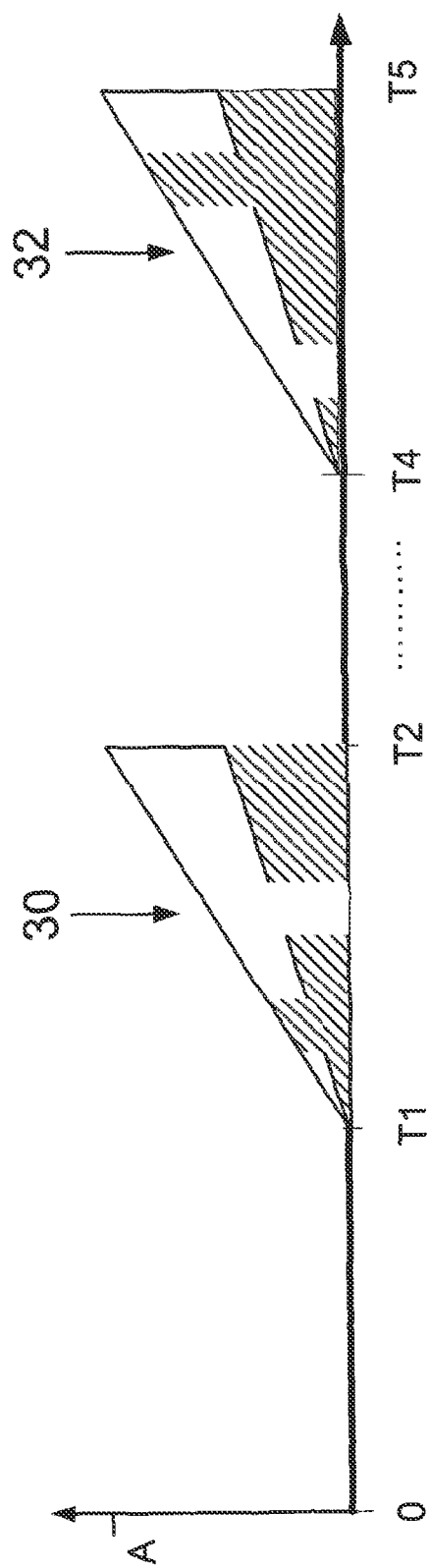
FIG. 2 schematically illustrates an interference-suppressed signal, which is formed from the signal in FIG. 1.

FIG. 2 shows an interference-suppressed symbol 30 and a second interference-suppressed symbol 32, composed from signal 11 or additional symbol 15 according to the method described herein.

Interference-suppressed symbol 30 is composed from first symbol 12 and second symbol 14 of symbol 11 according to the method described herein. In this case three types of different temporal segments of symbol 11 are differentiable. Since first symbol 12 and second symbol 14 transmit the same information, it is possible to superpose them temporally and to use the suitable segments that show no interference.

This is done according to the following decision pattern. A segment of the first type has interference, in the example from FIG. 1, first interference 20 and third interference 24 in first symbol 12, 16, and an absence of interference in second symbol 14, 18. Thus, interference-suppressed symbol 30 or additional interference-suppressed symbol 32 is equal to second symbol 14, 18 for this segment of the first type.

A segment of the second type has interference, in the example from FIG. 1, second interference 22 and fourth interference 26 in second symbol 14, 18, and an absence of interference in first symbol 12, 16. In this case, interference-suppressed symbol 30 or additional interference-suppressed symbol 32 is set to be equal to first symbol 12, 16.

In a segment of the third type, which is not shown in the example in FIG. 1, interference is present in the first symbol and in the second symbol. The interference-suppressed symbol for the segment of the third type is formed from an average value from the first and second symbol.

A segment of the fourth type has no interference in the first symbol and in the second symbol. This corresponds to the largest part and a plurality of temporal segments of symbol 11 shown in FIG. 1 and additional symbol 15. The correspondingly interference-suppressed symbol 30 or the additional interference-suppressed symbol 32 is equal to an average value from the first and second symbol for this segment of the fourth type.

Figure 3:
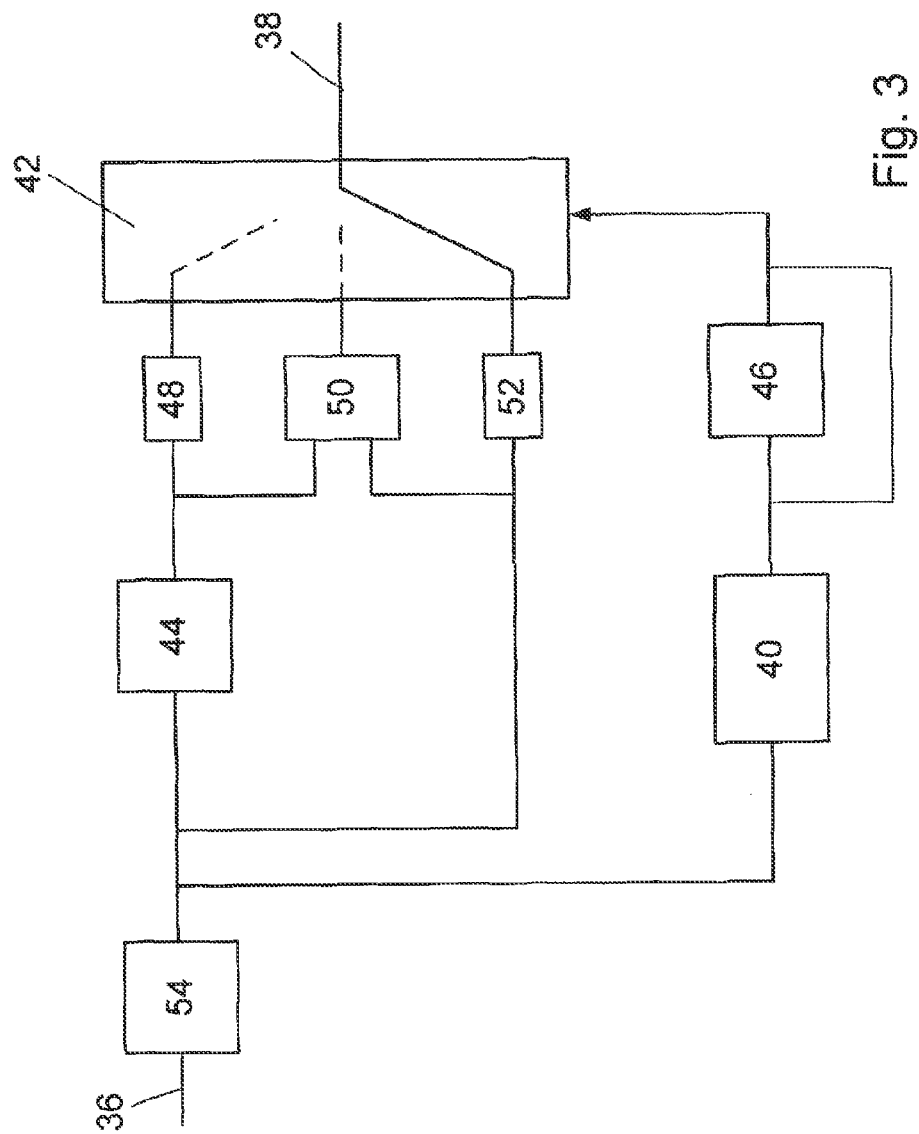
FIG. 3 is a block diagram of a signal processor for a method according to an example embodiment of the present invention.

FIG. 3 shows a block diagram for a method according to an example embodiment of the present invention and a circuit diagram for an electronic circuit on which a method according to an example embodiment of the present invention is able to be executed, or a computer program sequence for the method of an example embodiment of the present invention. For example, it is possible to provide the method on an FPGA.

In one realization for interference suppression of an OFDM signal, the method is implemented in a receiver for the OFDM method. A signal input 36 forwards the received signal, as illustrated in FIG. 1, for example, to an analog-digital converter 54. Analog-digital converter 54 has digital time resolution and digital depth, i.e., an amplitude discretization.

The analog-digital-converted signal is supplied to a detector 40, a memory element 44, an adding element 50, and a second multiplier 52. Memory element 44 is used as delay line, e.g., as FIFO element, for the temporal superpositioning of first symbol 12, 16 by corresponding second symbol 14, 18. For this purpose, the FIFO element has a memory capacity that corresponds to the temporal length of a first or second symbol. The output of the memory element is applied to a first multiplier and the adding element.

Detector 40 recognizes interference in the signal. In the example from FIG. 1, the detector recognizes first, second, third and fourth interference 20, 22, 24, 26. In the case of interference having a large amount, it is able to be detected by means of a threshold value. However, there are also other methods such as pattern detection, correlation methods etc. for detecting different types of interference.

Detector 40 outputs an interference value having the digital resolution of analog-digital converter 54. The interference value distinguishes between the presence of interference or an absence of interference in the signal at a digital depth of 1, i.e., the interference value is a 1-bit value. In example embodiments, the interference value may also reflect an intensity of the interference. The interference value is supplied to a decision element 42 via an additional memory element 46. Additional memory element 46 is used as delay line for the interference value, so that a value is applied at decision element 42 that corresponds to the interference value for the first symbol and for the second symbol. Thus, a 2-bit value is present, which includes the information whether interference is present in the first and/or second symbol for this discrete instant.

Decision element 42 is implemented as multiplexer, for instance, which, clocked at the digital resolution, switches outputs of the first and second multiplier and the adding element to a signal output 38. As basis of the value, decision element 42 composes an output signal according to the method described herein, such as the interference-suppressed signal shown in FIG. 2, from signal 10 shown in FIG. 1.

First and second multiplier 48, 52 multiply the received digital signal, preferably by the factor of two. In example embodiments, it is also possible to omit first and second multiplier 48, 52 and to insert a division element between adding element 50 and decision element 42, which halves the added signal again.

Signal output 38 then is connected to the additional elements of a receiver, such as a multiplexer, FFT unit, demodulator etc.

Figure 4:
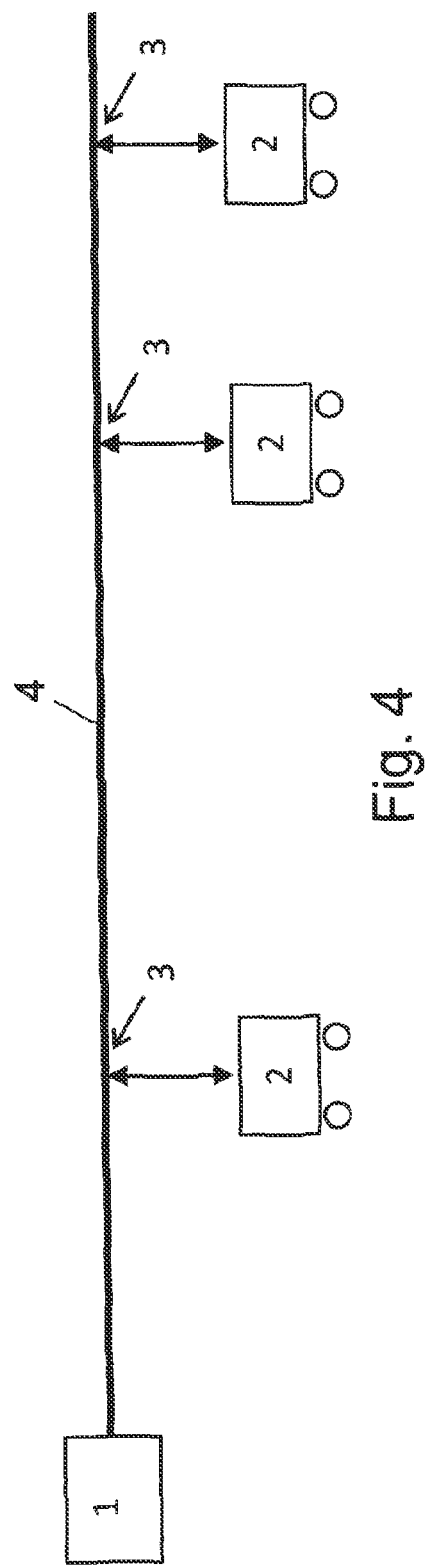
FIG. 4 schematically illustrates a device according to an example embodiment of the present invention for the transmission of energy and signals.

FIG. 4 shows a device according to an example embodiment of the present invention for the contactless transmission of signals and energy. The device has an infeed device 1 and movable parts 2. Movable parts 2 are coupled to a primary conductor 4 via an individual inductive coupling 3. The device is described in greater detail in German Published Patent Application No. 103 49 242.

Energy from the infeed device is transmitted to movable parts 2 via primary conductor 4. In addition, primary conductor 4 is also used to transmit a signal for data transmission between infeed device 1 and movable parts 2 and/or among movable parts 2. For this purpose, movable parts 2 have receivers, on which the method is executed.

Figure 5:
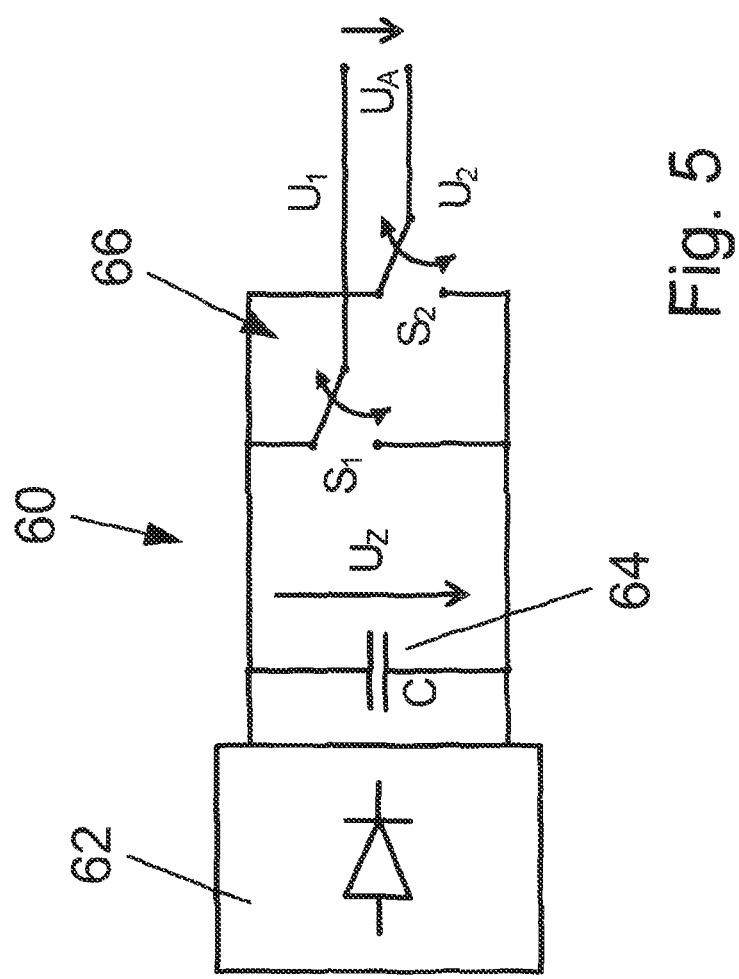
FIG. 5 schematically illustrates a voltage source.

For example, infeed device 1 has an infeed controller 60 shown in FIG. 5. Infeed controller 60 uses a mains voltage connected at rectifier 62 to form an alternating voltage $U_A$ via an intermediate circuit having an intermediate circuit capacitor 64. An inverter 66 of infeed controller 60 has at least two switches $S_1$ and $S_2$ for this purpose. The switching of the switches causes pulse noise, which interferes with the signal for the data transmission on the primary conductor. Interference in this signal may advantageously be suppressed by the method or by the receiver.

What is claimed is:

1. A method for interference suppression of a signal including one or more symbols, comprising:

transmitting each symbol twice in temporal succession as a first symbol and a second symbol so that a segment of the symbol corresponds to a segment of the first symbol and a segment of the second symbol;

detecting, by a detector, interference in at least one of (a) the first symbol and (b) the second symbol;

transmitting a value to a decision element; and generating, by the decision element, an interference-suppressed symbol from the first symbol and the second symbol on the basis of the value, according to the following decision pattern:

in a first segment of a first type, the detector detects interference in the first symbol and an absence of interference in the second symbol, whereupon the decision element sets the interference-suppressed symbol for this segment of the first type to be equal to the second symbol;

in a segment of a second type, the detector detects interference in the second symbol and an absence of interference in the first symbol, whereupon the decision element sets the interference-suppressed symbol for the segment of the second type to be equal to the first symbol;

in a segment of a third type, the detector detects interference in the first symbol and in the second symbol, whereupon the decision element sets the interference-suppressed symbol for the segment of the third type to be equal to an average value from the first and second symbols; and in a segment of a fourth type, the detector detects an absence of interference in the first symbol and in the second symbol, whereupon the decision element sets the interference-suppressed symbol for the segment of the fourth type to be equal an average value from the first and second symbol;

wherein the decision element composes the interference-suppressed signal from the interference-suppressed symbols.

2. The method according to claim 1, wherein the detector detects the interference when the signal exceeds a threshold value.

3. The method according to claim 1, wherein the detector detects the interference by pattern detection.

4. The method according to claim 1, further comprising high-pass filtering the signal supplied to the detector.

5. The method according to claim 1, wherein further comprising temporally superposing the first symbol and the second symbol by a memory element.

6. The method according to claim 1, further comprising temporally superposing an interference value of the detector which corresponds to the first symbol by an interference value of the second symbol by an additional memory element, so that two n-bit interference values are used to form the value as two times n-bit.

7. The method according to claim 1, wherein a value of a weighting corresponds to an intensity of the interference, which the detector determines, and in the segment of the third type, when interference is present in the first symbol and the second symbol simultaneously, the decision element calculating the interference-suppressed symbol according to the weighting of the interference, from the first symbol and the second symbol.

8. The method according to claim 1, wherein the interference occurs periodically, and the first symbol and the second symbol of one symbol in each case are provided in one period.

9. The method according to claim 1, wherein an OFDM method is used for signal transmission.

10. An electronic system adapted to perform the method recited in claim 1.

11. A receiver for receiving a signal including OFDM symbols, comprising:
an analog-digital converter;
a digital OFDM decoder connected to the analog-digital converter; and
an electronic system as recited in claim 10 arranged between the analog-digital converter and the digital OFDM decoder.

12. A device for contactless transmission of electrical power and information, from a first part to a second part movable relative to the first part, comprising:
at least one of (a) an alternating voltage source and (b) an alternating current source adapted to impress at least one of (a) a voltage and (b) a current having a first frequency into a primary conductor of the first part; and
a secondary winding, arranged as part of the second part, electromagnetically coupled to the primary conductor;
wherein additional signals having a carrier frequency higher than the first frequency are at least one of (a) coupleable and (b) modulatable onto the primary conductor; and
wherein the device is adapted to suppress interference in the signal in accordance with the method as recited in claim 1.

13. The device according to claim 12, wherein the second part includes at least one of:
(a) an electronic system adapted to suppress the interference in the signal in accordance with the method; and
(b) a receiver for receiving a signal including OFDM symbols, including:
an analog-digital converter;
a digital OFDM decoder connected to the analog-digital converter; and
an electronic system adapted to suppress the interference in the signal in accordance with the method and arranged between the analog-digital converter and the digital OFDM decoder.

14. The device according to claim 12, wherein the first part includes an infeed controller adapted to use a mains voltage to convert the mains voltage into a three-phase square-wave voltage having the first frequency, and to impress the three-phase square-wave voltage into the primary conductor via a voltage-controlled current source.

15. The device according to claim 12, wherein the secondary winding is inductively coupled to the primary conductor, a capacitor being connected to the secondary winding, in one of (a) series and (b) parallel, and an associated resonant frequency substantially corresponding to the first frequency.

* * * * *